(12) United States Patent
Li et al.

(10) Patent No.: US 12,466,537 B2
(45) Date of Patent: Nov. 11, 2025

(54) AIRCRAFT

(71) Applicant: AUTEL ROBOTICS CO., LTD., Shenzhen (CN)

(72) Inventors: Xiaode Li, Guangdong (CN); Boming Lu, Guangdong (CN); Liang Hao, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 18/522,455

(22) Filed: Nov. 29, 2023

(65) Prior Publication Data

US 2024/0174386 A1    May 30, 2024

(51) Int. Cl.
| | |
|---|---|
| *B64C 1/36* | (2006.01) |
| *B64U 10/14* | (2023.01) |
| *B64U 30/20* | (2023.01) |
| *B64U 60/50* | (2023.01) |
| *H01Q 1/28* | (2006.01) |

(52) U.S. Cl.
CPC ............... *B64C 1/36* (2013.01); *B64U 30/20* (2023.01); *H01Q 1/282* (2013.01); *B64U 10/14* (2023.01); *B64U 60/50* (2023.01)

(58) Field of Classification Search
CPC ........... B64C 25/64; B64C 25/32; B64C 1/36; B64U 60/50
See application file for complete search history.

(56) References Cited

U.S. PATENT DOCUMENTS

| | | | | |
|---|---|---|---|---|
| 2010/0025526 A1* | 2/2010 | Lawrence | ............... | B64U 40/10 |
| | | | | 244/17.23 |
| 2017/0113789 A1* | 4/2017 | Ou | ........................ | B64U 10/13 |
| 2021/0394923 A1* | 12/2021 | Yang | ..................... | H04N 23/71 |
| 2022/0363372 A1* | 11/2022 | Gao | ..................... | B64U 60/50 |
| 2023/0242283 A1* | 8/2023 | Tian | ......................... | B64C 5/02 |
| | | | | 244/123.1 |

FOREIGN PATENT DOCUMENTS

| | | | | | |
|---|---|---|---|---|---|
| CN | 209852586 U | * | 12/2019 | ............. | B64C 1/063 |
| CN | 110892578 A | * | 3/2020 | ............... | B64C 1/36 |
| CN | 111572791 A | * | 8/2020 | ............... | B64C 1/36 |

* cited by examiner

*Primary Examiner* — Joshua J Michener
*Assistant Examiner* — Cindi M Curry

(57) ABSTRACT

The embodiments of the present disclosure disclose an aircraft, including a housing, a first drive module, a first antenna module, a second drive module, a third drive module and a fourth drive module. The first drive module includes a first arm and a first drive assembly, one end of the first arm is arranged on the housing, and the first drive assembly is arranged at the other end of the first arm; the first antenna module is arranged at the other end of the first arm, and the first antenna module is located above the first drive assembly; and the second drive module includes a second arm and a second drive assembly, one end of the second arm is arranged on the housing, and the second drive assembly is arranged at the other end of the second arm.

15 Claims, 8 Drawing Sheets

AIRCRAFT

CROSS REFERENCE TO RELATED DISCLOSURE

This disclosure claims priority of Chinese Patent Disclosure No. 202223197316.3, filed on Nov. 30, 2022 and entitled "Aircraft", and claims priority of Chinese Patent Disclosure No. 202223260080.3, filed on Nov. 30, 2022 and entitle "Aircraft", the entire disclosure of which are incorporated herein by references for all purposes.

BACKGROUND

Related Art

Due to the impact of metal pieces on the performance of antennas, antennas configured for positioning in aircraft are generally required to be located above all metal pieces. Currently, antennas configured for positioning are generally provided at the top of aircraft housings.

During the implementation process of the embodiments of the present disclosure, the inventors have found that the method of providing an antenna configured for positioning on the top of aircraft housing makes it difficult to add a load to the top of the aircraft housing, which is not conducive to expanding the application range of aircraft.

SUMMARY

The embodiments of the present disclosure relate to the technical field of unmanned aerial vehicles, in particular to aircraft.

The main technical problem solved by the embodiments of the present disclosure is to provide an aircraft, which can overcome or at least partially solve the above problems.

According to the first aspect of the present disclosure, an aircraft comprising a housing, a first drive module, a first antenna module, a second drive module, a third drive module and a fourth drive module. The first drive module includes a first arm and a first drive assembly, wherein one end of the first arm is arranged at a position on a first side wall of the housing near a top of the housing, and the first drive assembly is arranged at the other end of the first arm; the first antenna module is arranged at the other end of the first arm, wherein the first antenna module is located above the first drive assembly, the first antenna module and the first drive assembly are respectively located at two sides of the other end of the first arm, and the first antenna module is configured for radiating a position signal of the aircraft; the second drive module includes a second arm and a second drive assembly, wherein one end of the second arm is arranged at a position on a second side wall of the housing near the top of the housing, the first side wall and the second side wall are opposite, and the second drive assembly is arranged at the other end of the second arm; the third drive module is arranged on the first side wall of the housing; and the fourth drive module is arranged on the second side wall of the housing, wherein the first drive module, the second drive module, the third drive module, and the fourth drive module are collectively configured to drive the aircraft to move.

According to the second aspect of the present disclosure, An unmanned aerial vehicle, comprising: a housing; a first connecting arm, one end of the first connecting arm being arranged on a first side wall of the housing; a second connecting arm, one end of the second connecting arm being arranged on a second side wall of the housing, and the first side wall and the second side wall being opposite; a first driving module mounted to the other end of the first connecting arm; a second driving module mounted to the other end of the second connecting arm; a third driving module mounted to one end of the first side wall away from the first connecting arm; a fourth driving module mounted to one end of the second side wall away from the second connecting arm; a first supporting foot, one end of the first supporting foot being mounted to the other end of the first connecting arm, and the first supporting foot being located below the first driving module; a second supporting foot, one end of the second supporting foot being mounted to the other end of the second connecting arm, and the second supporting foot being located below the second driving module; and a third supporting foot, one end of the third supporting foot being mounted to a bottom wall of the housing, wherein the first supporting foot, the second supporting foot and the third supporting foot are distributed in a triangular shape, and the first supporting foot, the second supporting foot and the third supporting foot are together used for supporting the unmanned aerial vehicle.

BRIEF DESCRIPTION OF THE DRAWINGS

In order to illustrate specific embodiments of the present disclosure or the technical solutions in the prior art more clearly, the following will briefly introduce the drawings that need to be used in the description of the specific embodiments or the prior art. Throughout the drawings, like elements or portions are generally identified by like reference numerals. In the drawings, elements or portions may not necessarily be drawn to the actual scale.

DETAILED DESCRIPTION

Figure 1:
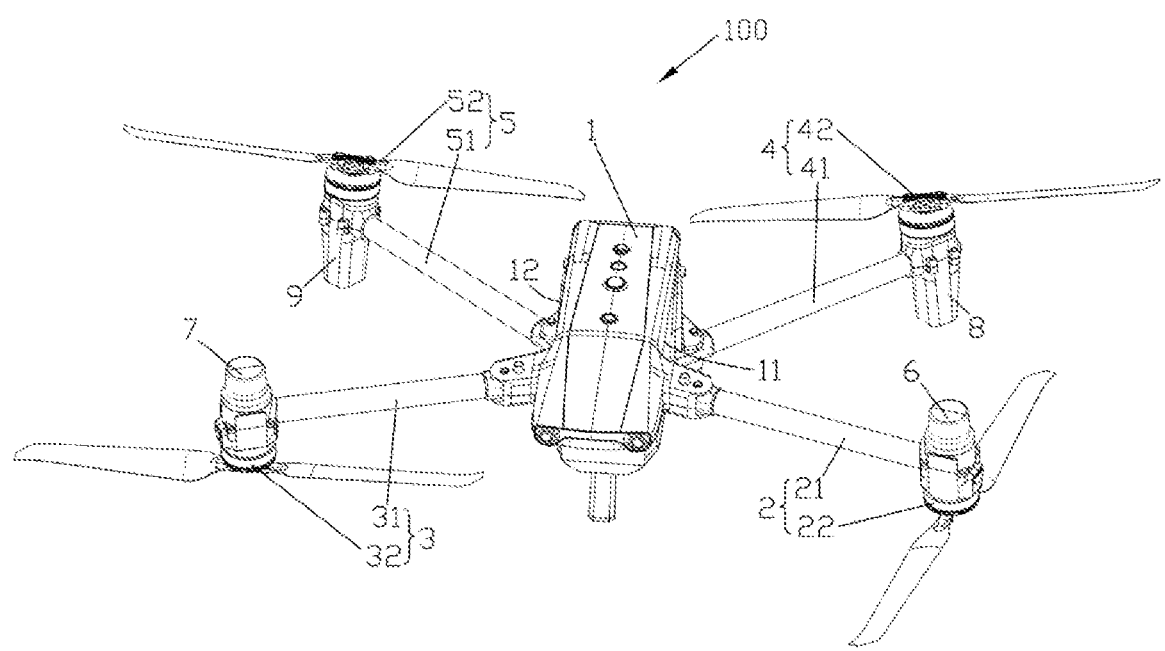
FIG. 1 is a schematic structural diagram of an embodiment of the present disclosure.

In order to make the present disclosure readily understood, a more detailed description of the present disclosure will be rendered with reference to the appended drawings and specific embodiments. It should be noted that when an element is referred to as being "secured" to another element, it can be directly on the other element or one or more intervening elements may be present therebetween. When one element is referred to as being "connected" to another element, it can be directly connected to the other element or one or more intervening elements may be present therebetween. When one element is referred to as being "mounted" to another element, it can be directly mounted to the other element or one or more intervening elements may be present therebetween. In the description, the orientation or positional relationships indicated by the terms used herein "up", "down", "inside", "outside", "vertical", "horizontal" etc. are based on the orientation or positional relationship shown in the drawings, and are only for the convenience of describing the disclosure and simplifying the description, rather than indicating or implying that the referred device or element must have a specific orientation, or be constructed and operated in a specific orientation, and therefore cannot be construed as a limitation of the present disclosure. Furthermore, the terms "first", "second", etc. are only configured for descriptive purposes and are not to be construed as indicating or implying relative importance.

Unless defined otherwise, all technical and scientific terms used in the specification have the same meaning as commonly understood by one of ordinary skill in the art to which the present disclosure belongs. The terminology used in the description of the present disclosure is for the purpose of describing specific embodiments only and is not intended to limit the present disclosure. As used herein, the term "and/or" includes any and all combinations of one or more of the associated listed items.

Furthermore, the technical features involved in the different embodiments of the present disclosure described below can be combined with each other as long as they do not conflict with each other.

Referring to FIG. 1, an aircraft 100 includes: a housing 1, a first drive module 2, a second drive module 3, a third drive module 4, a fourth drive module 5, a first antenna module 6, a second antenna module 7, a third antenna module 8 and a fourth antenna module 9. The first drive module 2, the second drive module 3, the third drive module 4 and the fourth drive module 5 are all arranged on the housing 1, and the first drive module 2, the second drive module 3, the third drive module 4 and the fourth drive module 5 jointly surround the housing 1, and the first drive module 2, the second drive module 3, the third drive module 4 and the fourth drive module 5 are all configured for driving the aircraft 100 to move. The first antenna module 6 is arranged at one end of the first drive module 2 away from the housing 1, the second antenna module 7 is arranged at one end of the second drive module 3 away from the housing 1, the third antenna module 8 is arranged at one end of the third drive module 4 away from the housing 1, the fourth antenna module 9 is arranged at one end of the fourth drive module 5 away from the housing 1, the first antenna module 6 and the second antenna module 7 are both configured for radiating a position signal of the aircraft 100, and the third antenna module 8 and the fourth antenna module 9 are both configured for radiating an image signal.

For the first drive module 2 mentioned above, please refer to FIGS. 1 and 2. The first drive module 2 includes a first engine arm 21 and a first drive assembly 22. One end of the first engine arm 21 is provided at a position near the top of the housing 1 on the first side wall 11 of the housing 1, and the first drive assembly 22 is provided at the other end of the first engine arm 21. The first antenna module 6 is also provided at the other end of the first engine arm 21, and the first antenna module 6 is located above the first drive assembly 22, and the first antenna module 6 and the first drive assembly 22 are respectively located on two sides of the other end of the first engine arm 21. Specifically, the first drive assembly 22 is located on one side of the other end of the first engine arm 21 facing downward, and the first antenna module 6 is located on a side of the other end of the first engine arm 21 facing upward. By providing one end of the first engine arm 21 at a position near the top of the housing 1 on the first side wall 11 of the housing 1, and providing the first antenna module 6 at the other end of the first engine arm 21, and locating the first antenna module 6 above the first drive assembly 22, the first antenna module 6 can be located at a position near the top of the aircraft 100, thereby ensuring that the first antenna module 6 is positioned above other metal pieces in the aircraft 100. Furthermore, the risk of interference by other metal pieces when the first antenna module 6 radiates position signals in a direction above the aircraft 100 is reduced, ensuring the performance of the first antenna module 6.

Figure 2:
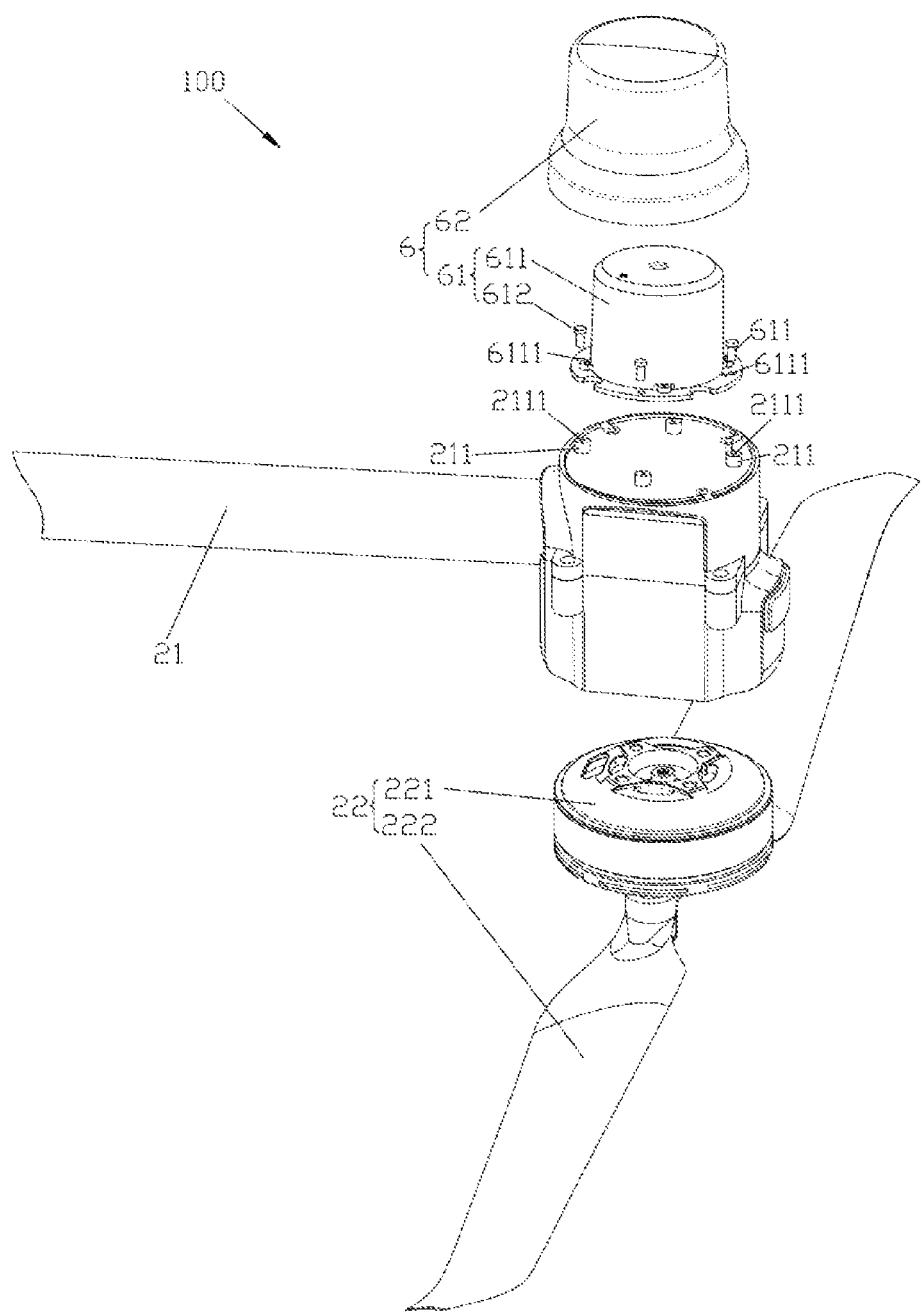
FIG. 2 is a schematic structural diagram of a first engine arm, a first drive assembly, and a first antenna module in an embodiment of the present disclosure.

With regard to the above-mentioned first arm 21, referring to FIG. 2. The other end of the first arm 21 is provided with a first protrusion 211, and the first protrusion 211 is provided with a first screw groove 2111.

For the first drive assembly 22 mentioned above, please refer to FIG. 2. The first drive assembly includes a first motor 221 and a first propeller 222. The first motor 221 is fixed to one side at the other end of the first arm 21 facing downwards, and the first propeller 222 is fixed to the output shaft (not marked) of the first motor 221, so that the first motor 221 can drive the first propeller 222 to rotate, thereby providing power to the aircraft 100.

For the second drive module 3 mentioned above, please refer to FIGS. 1 and 3. The second drive module 3 includes a second arm 31 and a second drive assembly 32. One end of the second arm 31 is provided at a position near the top of the housing 1 on the second side wall 12 of the housing 1, the second side wall 12 being opposite to the first side wall 11, and the second drive assembly 32 is provided at the other end of the second arm 31. The second antenna module 7 is also provided at the other end of the second arm 31, and the second antenna module 7 is located above the second drive assembly 32, and the second antenna module 7 and the second drive assembly 32 are respectively located on two sides of the other end of the second arm 31. Specifically, the second drive assembly 32 is located on one side of the other end of the second arm 31 facing downward, and the second antenna module 7 is located on one side of the other end of the second arm 31 facing upward. By providing one end of the second arm 31 at a position near the top of the housing 1 on the second side wall 12 of the housing 1, and providing the second antenna module 7 at the other end of the second arm 31, and locating the second antenna module 7 above the second drive assembly 32, the second antenna module 7 can be located at a position near the top of the aircraft 100, thereby ensuring that the second antenna module 7 is positioned above other metal pieces in the aircraft 100. Furthermore, the risk of interference by other metal pieces when the second antenna module 7 radiates position signals in a direction above the aircraft 100 is reduced, ensuring the performance of the second antenna module 7.

Figure 3:
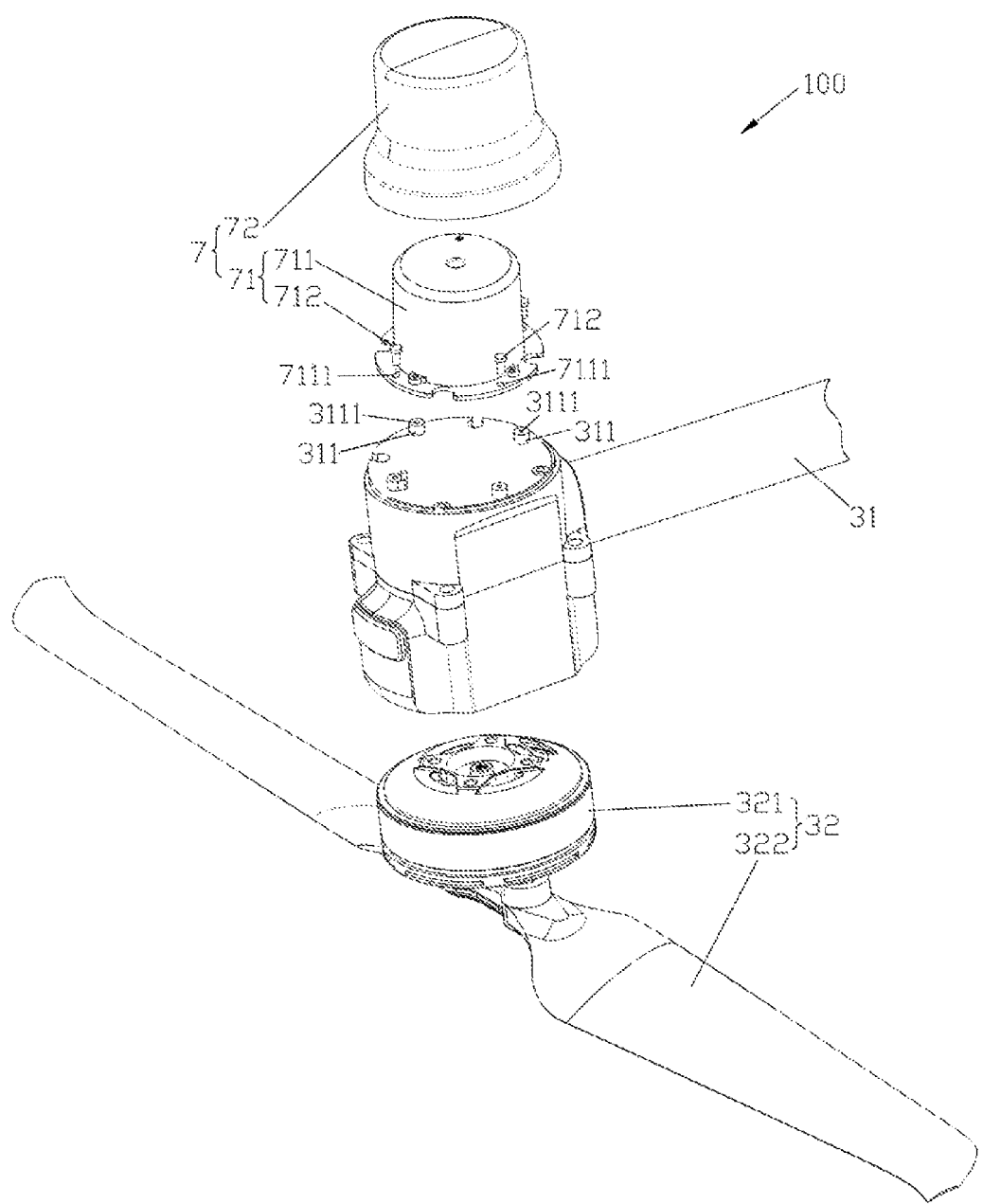
FIG. 3 is a schematic structural diagram of a second engine arm, a second drive assembly, and a second antenna module in an embodiment of the present disclosure.

With regard to the above-mentioned second arm 31, referring to FIG. 3. The other end of the second arm 31 is provided with a second protrusion 311, and the second protrusion 311 is provided with a second screw groove 3111.

For the second drive assembly 32 mentioned above, please refer to FIG. 3. The second drive assembly 32 includes a second motor 321 and a second propeller 322. The second motor 321 is fixed to one side at the other end of the second arm 31 facing downwards, and the second propeller 322 is fixed to the output shaft (not marked) of the second motor 321, so that the second motor 321 can drive the second propeller 322 to rotate, thereby providing power to the aircraft 100.

For the third drive module 4 mentioned above, please refer to FIGS. 1 and 4. The third drive module 4 includes a third arm 41 and a third drive assembly 42. One end of the third arm 41 is provided on the first side wall 11 of the housing 1, the third drive assembly 42 is provided at the other end of the third arm 41, and the third drive assembly 42 is located on one side of the other end of the third arm 41 facing upward. The third antenna module 8 is arranged at the other end of the third arm 41, and the third antenna module 8 is located on one side of the other end of the third arm 41 facing away from the third drive assembly 42.

For the third drive assembly 42 mentioned above, please refer to FIG. 4. The third drive assembly 42 includes a third motor 421 and a third propeller 422. The third motor 421 is fixed to one side at the other end of the third arm 41 facing upwards, and the third propeller 422 is fixed to the output shaft (not marked) of the third motor 421, so that the third motor 421 can drive the third propeller 422 to rotate, thereby providing power to the aircraft 100.

For the fourth drive module 5 mentioned above, please refer to FIG. 1. The fourth drive module 5 includes a fourth connecting arm 51, a fourth motor 202, and a fourth blade 52. One end of the fourth arm 51 is provided on the second side wall 12 of the housing 1, the fourth drive assembly 52 is provided at the other end of the fourth arm 51, and the fourth drive assembly 52 is located on one side of the other end of the fourth arm 51 facing upward. The fourth antenna module 9 is arranged at the other end of the fourth arm 51, and the fourth antenna module 9 is located on one side of the other end of the fourth arm 51 facing away from the fourth drive assembly 52.

Figure 5:
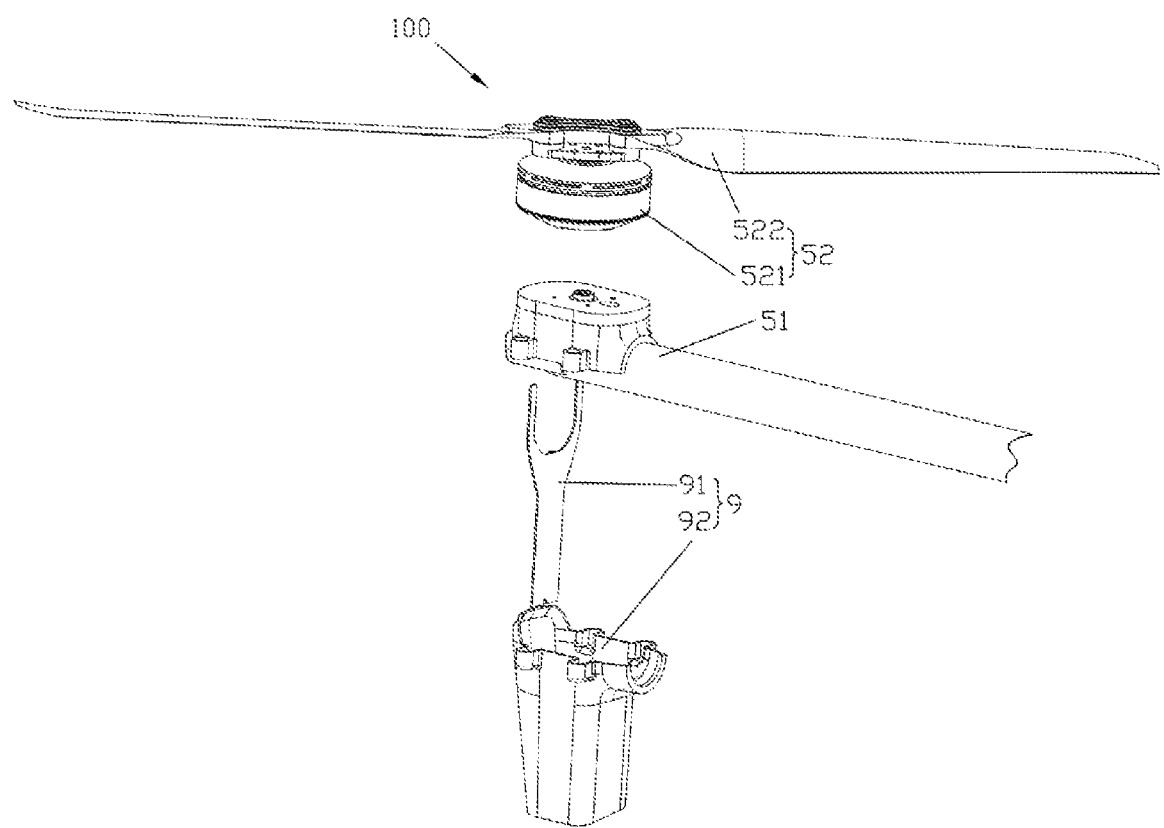
FIG. 5 is a schematic structural diagram of a fourth engine arm, a fourth drive assembly, and a fourth antenna module in an embodiment of the present disclosure.

For the fourth drive assembly 52 mentioned above, please refer to FIG. 5. The fourth drive assembly 52 includes a fourth motor 521 and a fourth propeller 522. The fourth motor 521 is fixed to one side at the other end of the fourth arm 51 facing upwards, and the fourth propeller 522 is fixed to the output shaft (not marked) of the fourth motor 521, so that the fourth motor 521 can drive the fourth propeller 522 to rotate, thereby providing power to the aircraft 100.

For the first antenna module 6 mentioned above, please refer to FIG. 2. The first antenna module includes a first antenna assembly 61 and a first radome 62. The first antenna assembly 61 is fixed to the other end of the first arm 21, the first radome 62 is mounted to the other end of the first arm 21, and the first radome 62 covers the first antenna assembly 61 so as to prevent the first antenna assembly 61 from being exposed, thereby preventing dust or water vapor in the air from directly contacting the first antenna assembly 61, which is advantageous in extending the service life of the first antenna module 6.

It could be understood that the manner of the fixing between the first radome 62 and the other end of the first arm 21 is not exclusive. For example, fixing may be performed by a screw or pressing-fit fixing may be performed by ultrasonic wave, etc. which will not be described in detail herein.

For the first antenna assembly 61 mentioned above, please refer to FIG. 2. The first antenna assembly includes a first antenna 611 and a first threaded piece 612. The first antenna 611 is configured for radiating a position signal of the aircraft 100, the first antenna 611 is provided with a first through hole 6111, the first threaded piece 612 passes through the first through hole 6111 and is then threaded to the first screw groove 2111, and the first antenna 611 abuts against the first protrusion 211, thereby fixing the first antenna 611 to the first arm 21. It is worth noting that the first radome 62 is made of a non-metallic material to avoid the interference with the first antenna 611, and the first antenna 611 is located above other metal pieces in the aircraft 100 to reduce the risk of the interference by other metal pieces when the first antenna 611 radiates position signals in a direction above the aircraft 100, ensuring the performance of the first antenna 611.

In some embodiments, referring to FIG. 2, the number of the first protrusions 211, the first screw grooves 2111, the first through holes 6111 and the first threaded pieces 612 is multiple, the multiple first protrusions 211 are all arranged on the other end of the first arm 21, the multiple first protrusions 211 are distributed in a circle, and the multiple first through holes 6111 are all arranged on the first antenna 611. One first screw groove 2111 is arranged on the first protrusion 211, one first threaded piece 612 passes through one first through-hole 6111 and is threaded to the first screw groove 2111, and the first antenna 611 abuts against multiple first protrusions 211 to ensure the stability of the fixation between the first antenna 611 and the first arm 21.

For the second antenna module 7 mentioned above, please refer to FIG. 3. The second antenna module includes a second antenna assembly 71 and a second radome 72. The second antenna assembly 71 is fixed to the other end of the second arm 31, the second radome 72 is mounted to the other end of the second arm 31, and the second radome 72 covers the second antenna assembly 71 to prevent the second antenna assembly 71 from being exposed, which is advantageous in extending the service life of the second antenna assembly 71.

It could be understood that the manner of the fixing between the second radome 72 and the other end of the second arm 31 is not exclusive. For example, fixing may be performed by a screw or pressing-fit fixing may be performed by ultrasonic wave, etc. which will not be described in detail herein.

For the second antenna assembly 71 mentioned above, please refer to FIG. 3. The second antenna assembly 71 includes a second antenna 711 and a second threaded piece 712. The second antenna 711 is configured for radiating a position signal of the aircraft 100, the second antenna 711 is provided with a second through hole 7111, the second threaded piece 712 passes through the second through hole 7111 and is then threaded to the second screw groove 3111, and the second antenna 711 abuts against the second protrusion 311, thereby fixing the second antenna 711 to the second arm 31. By providing the second antenna 711, the ability of the aircraft 100 to radiate position signals may be enhanced so that a user may more quickly and accurately acquire position information of the aircraft 100. It is worth noting that the second radome 72 is made of a non-metallic material to avoid the interference with the second antenna 711, and the second antenna 711 is located above other metal pieces in the aircraft 100 to reduce the risk of the interference by other metal pieces when the second antenna 711 radiates position signals in a direction above the aircraft 100, ensuring the performance of the second antenna 711.

In some embodiments, referring to FIG. 3, the number of the second protrusions 311, the second screw grooves 3111, the second through holes 7111 and the second threaded pieces 712 is multiple, the multiple second protrusions 311 are all arranged on the other end of the second arm 31, the multiple second protrusions 311 are distributed in a circle, and the multiple second through holes 7111 are all arranged on the second antenna 711. One second screw groove 3111 is arranged on the second protrusion 311, one second threaded piece 712 passes through one second through-hole 7111 and is threaded to the second screw groove 3111, and the second antenna 711 abuts against multiple second protrusions 311 to ensure the stability of the fixation between the second antenna 711 and the second arm 31.

Figure 4:
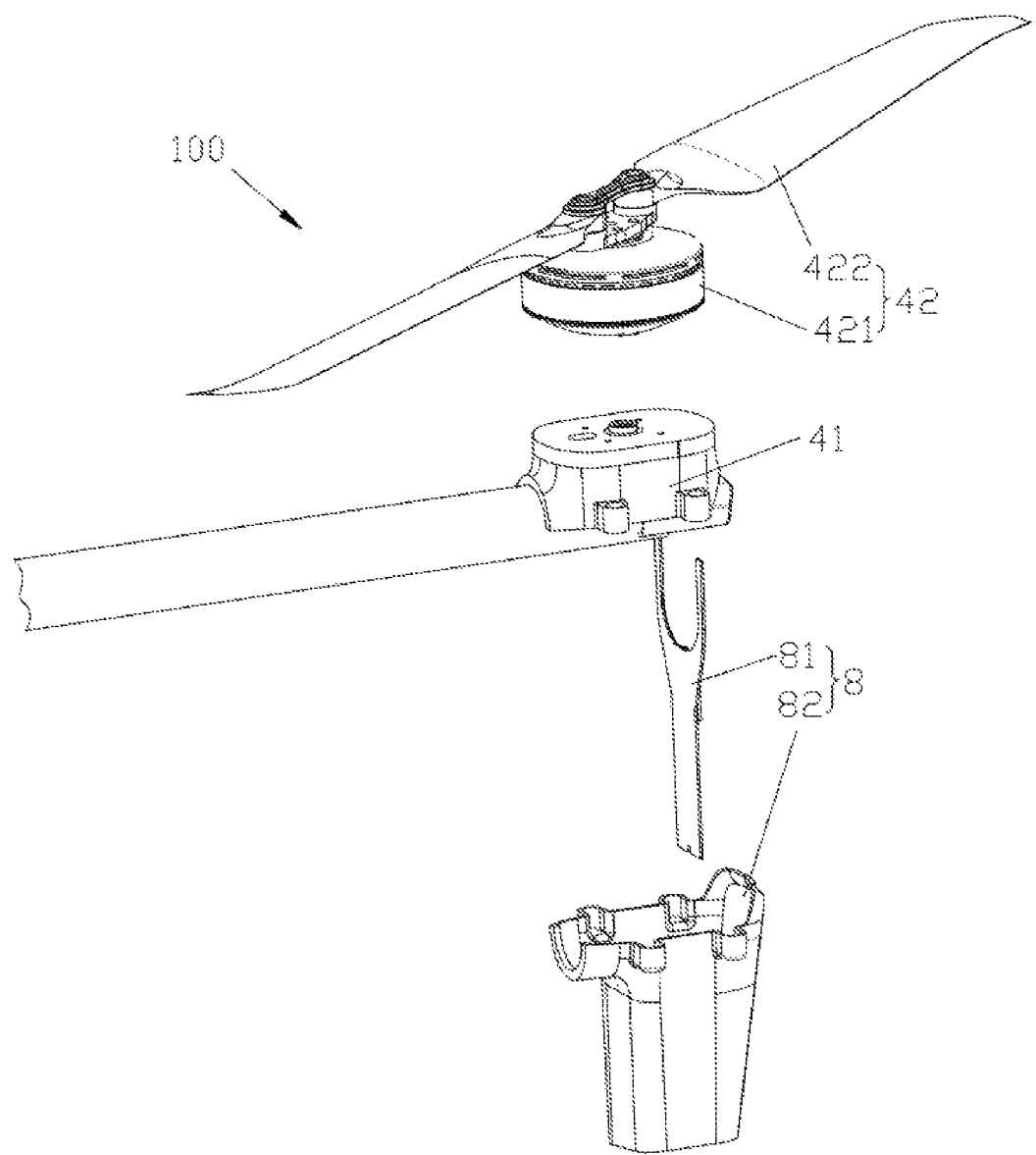
FIG. 4 is a schematic structural diagram of a third engine arm, a third drive assembly, and a third antenna module in an embodiment of the present disclosure.

With regard to the above-mentioned third antenna module 8, referring to FIG. 4, the third antenna module 8 comprises a third antenna 81 and a third radome 82. The third antenna 81 is configured for radiating an image signal, the third antenna 81 is mounted to one side of the other end of the third arm 41 facing away from the third drive assembly 42, the third radome 82 is fixed on the other end of the third arm 41, and the third radome 82 covers the third antenna 81 so as to prevent the third antenna 81 from being exposed to the outside, thereby reducing circumstances that the dust or water vapor in the air contaminate the third antenna 81, which is advantageous in extending the service life of the third antenna 81. By mounting the third antenna 81 at the other end of the third arm 41, the third antenna 81 is as far away from other electronic elements in the housing 1 as possible such that the interference between the other electronic elements in the housing 1 and the third antenna 81 is effectively reduced.

For the fourth antenna module 9 mentioned above, please refer to FIG. 5. The fourth antenna module 9 includes a fourth antenna 91 and a fourth radome 92. The fourth antenna 91 and the third antenna 81 are each for radiating an image signal, the fourth antenna 91 is mounted on one side of the other end of the fourth arm 51 facing away from the fourth drive assembly 52, the fourth radome 92 is fixed to the other end of the fourth arm 51, and the fourth radome 92 covers the fourth antenna 91. By providing the fourth antenna 91, the transmission of image signals by the aircraft 100 can be enhanced.

In an embodiment of the present disclosure, one end of the first arm 21 is arranged at the position on the first side wall 11 of the housing 1 near the top of the housing 1, the first antenna module 6 and the first drive assembly 22 are both arranged at the other end of the first arm 21, and the first antenna module 6 is located above the first drive assembly 22, thereby ensuring that the first antenna module 6 is located above all the metal components in the aircraft 100, and ensuring the performance of the first antenna module 6. At the same time, since no antenna is arranged at the top of the housing 1, a load can be added at the top of the housing 1, making it advantageous to expand the range of applications for the aircraft 100.

In an embodiment of the present disclosure, the third radome 82 can also serve as a first supporting foot for the unmanned aerial vehicle (UAV), providing support during landing. Similarly, the fourth radome 92 can function as a second supporting foot for the UAV during landing. One end of the third supporting foot 16 is mounted on a bottom wall 111 of the housing 1, and the third radome 82, the fourth radome 92 and the third supporting foot 16 are distributed in a triangular arrangement, the third radome 82, and the third supporting foot 16 collectively support the UAV 100. The third radome 82 is mounted on the other end of the third arm 41, the fourth radome 92 is mounted on the other end of the fourth arm 51, and the third supporting foot 16 is mounted on the bottom wall 111 of the housing 1, This arrangement increases the triangular area formed by the three contact points of the the third radome 82, the fourth radome 92, and the third supporting foot 16 with the ground, enhancing the stability of the support provided by the third radome 82, the fourth radome 92, and the third supporting foot 16 to the UAV 100. Additionally, when the UAV 100 lands on the ground, this configuration effectively reduces the risk of the UAV tipping over.

Figure 6:
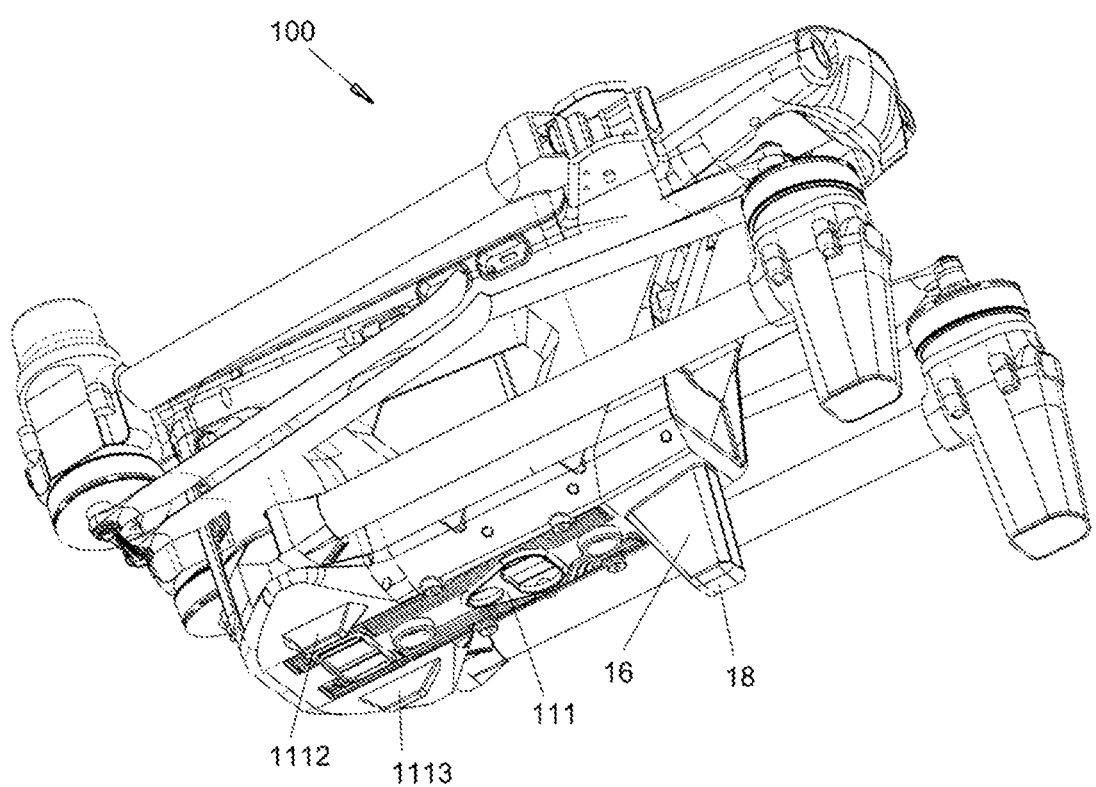
FIG. 6 is a schematic structural diagram from a fourth viewing angle when a first arm, a second arm, a third arm, and a fourth arm of an unmanned aerial vehicle in an embodiment of the present disclosure are in a folded state.

Regarding the third supporting foot 16 mentioned above, please refer to FIGS. 6 to 8. The third supporting foot 16 is equipped with a first screw groove 161 and a clamping part 162. The first screw groove 161 is located at one end of the third supporting foot 16, and the clamping part 162 is located at the other end of the third supporting foot 16. The unmanned aerial vehicle (UAV) 100 also includes a first screw member 17. The bottom wall 111 of the housing 1 is provided with a first through-hole 1111. The first screw member 17 passes through the first through-hole 1111 and is screwed into the first screw groove 161, thus fixing one end of the third supporting foot 16 to the bottom wall 111 of the housing 1. The anti-skid component 18 is provided with a clamping groove 181, and the clamping part 162 is inserted into a clamping groove 181. This not only achieves a secure fixation between the anti-skid component 18 and the third supporting foot 16 but also allows for easy replacement of the anti-skid component 18.

Figure 7:
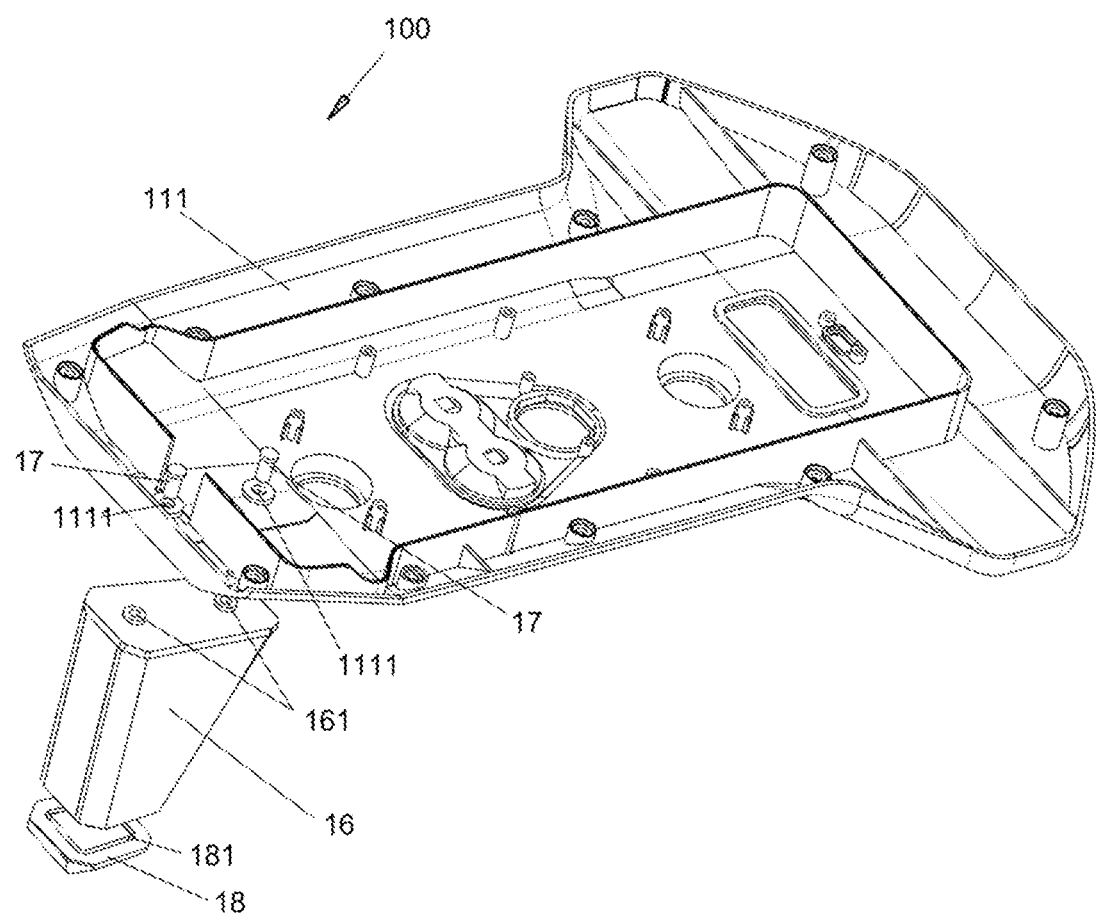
FIG. 7 is a schematic structural diagram of the bottom wall of a housing, a third supporting foot, and an anti-skid assembly in an embodiment of the present disclosure.

In some embodiments, please refer to FIG. 7, the number of the first screw members 17, first through-holes 1111, and the first screw grooves 161 are multiple. The multiple first through-holes 1111 are all set on the bottom wall 111, and the multiple first screw grooves 161 are all set on the third supporting foot 16. Each first screw member 17 passes through a corresponding first through-hole 1111 and is screwed into a corresponding first screw groove 161, in order to enhance the fixation effect between one end of the third radome 82 and the bottom wall 111 of the housing 1.

Figure 8:
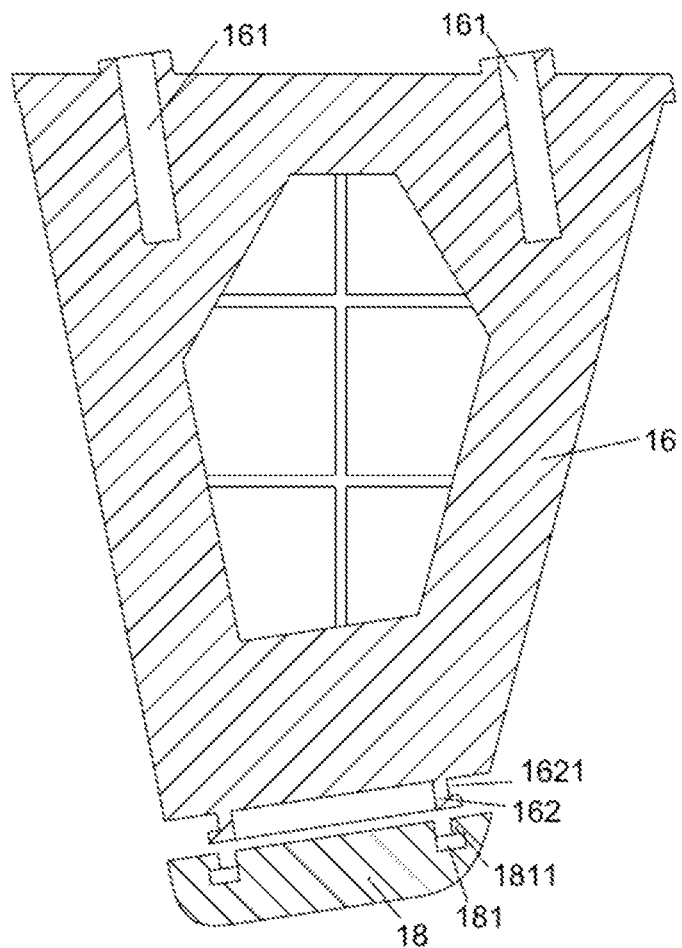
FIG. 8 is a schematic structural diagram of a third supporting foot and an anti-skid assembly in an embodiment of the present disclosure.

Regarding the aforementioned the clamping part 162, please refer to FIG. 8. The clamping part 162 is provided with a receiving slot 1621, which surrounds the clamping part 162. The entrance of the clamping groove 181 is also equipped with a limiting protrusion 1811, which surrounds the entrance of the receiving slot 1621. When the clamping part 162 is inserted into the clamping groove 181, the limiting protrusion 1811 is accommodated in the receiving slot 1621. This arrangement reduces the risk of the anti-skid component 18 becoming disengaged from the clamping part 162.

Alternatively, the first antenna module comprises a first antenna assembly and a first radome, the first antenna assembly being fixed at the other end of the first arm, the first radome being mounted at the other end of the first arm, and the first radome covering the first antenna assembly.

Alternatively, the first antenna assembly comprises a first antenna and a first threaded piece, the first antenna is provided with a first through-hole, the other end of the first arm is provided with a first screw groove, the first threaded piece passes through the first through-hole and is then threaded to the first screw groove, and the first antenna is configured to radiate a position signal of the aircraft.

Alternatively, the other end of the first arm is provided with a first protrusion, the first screw groove is provided on the first protrusion, and the antenna abuts against the first protrusion.

Alternatively, the number of the first protrusions, first screw grooves, first through-holes, and first threaded pieces is multiple, the multiple first protrusions are all arranged at the other end of the first arm, the multiple first through-holes are all arranged on the first antenna, one first screw groove is arranged on one first protrusion, one first threaded piece passes through one first through-hole and is then threaded to one first screw groove, and the first antenna abuts against the multiple first protrusions.

Alternatively, the aircraft further comprises a second antenna module, the second antenna module is arranged at the other end of the second arm, the second antenna module is located above the second drive assembly, the second antenna module and the second drive assembly are respectively located at two sides of the other end of the second arm, and the second antenna module and the first antenna module are both configured for radiating a position signal of the aircraft.

Alternatively, the second antenna module comprises a second antenna assembly and a second radome, the second antenna assembly being fixed at the other end of the second arm, the second radome being mounted at the other end of the second arm, and the second radome covering the second antenna assembly.

Alternatively, the second antenna assembly comprises a second antenna and a second threaded piece, the second antenna is provided with a second through-hole, the other end of the second arm is provided with a second screw groove, the second threaded piece passes through the second through-hole and is then threaded to the second screw groove, and the second antenna is configured to radiate a position signal of the aircraft.

Alternatively, the third drive module comprises a third arm and a third drive assembly, wherein one end of the third arm is arranged on the first side wall of the housing, the third drive assembly is arranged at the other end of the third arm, and the first drive assembly, the second drive assembly and the third drive assembly are all configured for driving the aircraft to move; and the aircraft further comprises a third antenna module provided at the other end of the third arm, the third antenna module being configured for radiating an image signal.

Alternatively, the fourth drive module comprises a fourth arm and a fourth drive assembly, wherein one end of the fourth arm is arranged on the second side wall of the housing, the fourth drive assembly is arranged at the other end of the fourth arm, and the first drive assembly, the second drive assembly and the fourth drive assembly are all configured for driving the aircraft to move; and the aircraft further comprises a fourth antenna module provided at the other end of the fourth arm, the fourth antenna module being configured for radiating an image signal.

The advantageous effects of the embodiments of the present disclosure are as follows: different from the prior art, according to the embodiments of the present disclosure, one end of the first arm is arranged at the position on the first side wall of the housing near the top of the housing, the first antenna module and the first drive assembly are both arranged at the other end of the first arm, and the first antenna module is located above the first drive assembly, thereby ensuring that the first antenna module is located above all the metal components in the aircraft, and ensuring the performance of the first antenna module; at the same time, since no antenna is arranged at the top of the housing, a load can be added at the top of the housing, making it advantageous to expand the range of applications for the aircraft, The area of the triangle formed by the three points where the first, second, and third supporting feet contact the ground is sufficiently large. This ensures that even if the unmanned aerial vehicle (UAV) lands on uneven terrain, the risk of the UAV tipping over is reduced.

The above descriptions are only embodiments of the present disclosure, and do not thus limit the scope of the patent of the present disclosure. Any equivalent structure or equivalent flow transformation made by using the content of the description and accompanying drawings of the present disclosure, or directly or indirectly applied in other related technical fields, is equally included in the scope of patent protection of the present disclosure.

What is claimed is:

1. An aircraft, comprising:
   a housing;
   a first, second, third or fourth assemblies, each including an arm, wherein each arm has a first end arranged at a position on a side wall of the housing and a second end opposite the first end, and each drive assembly is arranged at the second end of its respective arm;
   at least one antenna module, arranged on at least one of the arms and configured to radiate a position signal of the aircraft, wherein the at least antenna module is located above a corresponding drive assembly on a corresponding arm; and
   an anti-skid assembly, wherein the anti-skid assembly is provided with a clamping groove, and the clamping groove has a limiting protrusion.

2. The aircraft according to claim 1, wherein
   the antenna module comprises a first antenna assembly and a first radome, the first antenna assembly being fixed at the second end of the corresponding arm, the first radome being mounted at the second end of the corresponding arm, and the first radome covering the first antenna assembly.

3. The aircraft according to claim 2, wherein
   the first antenna assembly comprises a first antenna and a first threaded piece, the first antenna is provided with a first through-hole, the first end of the corresponding arm is provided with a first screw groove, the first threaded piece passes through the first through-hole and is then threaded to the first screw groove, and the first antenna is configured to radiate a position signal of the aircraft.

4. The aircraft according to claim 3, wherein
   the first end of the corresponding arm is provided with a first protrusion, the first screw groove is configured to the first protrusion, and the first antenna abuts against the first protrusion.

5. The aircraft according to claim 4, wherein
   there are multiple instances of the first protrusion, first screw groove, first through-hole, and first threaded pieces, the first protrusion is all arranged at the second end of the corresponding arm, the first through-hole is arranged on the first antenna, the first screw groove is arranged on the first protrusion, one first threaded piece passes through the first through-hole and is then threaded to the first screw groove, and the first antenna abuts against the first protrusion.

6. The aircraft according to claim 2, wherein
   the antenna module further comprises a second antenna module, the second antenna module is arranged at the second end of the corresponding arm, the second antenna module is located above the second drive assembly, the second antenna module and the second drive assembly are located on one each of upper or lower side respectively of the second end of the second arm, and the second antenna module and the first antenna module are both configured to radiate a position signal of the aircraft.

7. The aircraft according to claim 6, wherein
   the second antenna module comprises a second antenna assembly and a second radome, the second antenna assembly being fixed at the second end of the corresponding arm, the second radome being mounted at the second end of the second arm, and the second radome covering the second antenna assembly.

8. The aircraft according to claim 7, wherein
the second antenna assembly comprises a second antenna and a second threaded piece, the second antenna is provided with a second through-hole, the other end of the corresponding arm is provided with a second screw groove, the second threaded piece passes through the second through-hole and is then threaded to the second screw groove, and the second antenna is configured to radiate a position signal of the aircraft.

9. The aircraft according to claim 2, wherein
the antenna module further comprises a third antenna module provided at the second end of the corresponding arm, the third antenna module being configured to radiate an image signal.

10. The aircraft according to claim 9, wherein
the antenna module further comprises a fourth antenna module provided at the other end of the fourth arm, the fourth antenna module being configured to radiate an image signal.

11. The aircraft according to claim 1, wherein
the aircraft comprises a first supporting foot, a second supporting foot and a third supporting foot, wherein the first supporting foot, the second supporting foot and the third supporting foot are distributed in a triangular shape, and the first supporting foot, the second supporting foot and the third supporting foot are together configured to support the aircraft.

12. The aircraft according to claim 11, wherein
the first supporting foot, a first end of the first supporting foot being arranged on at least one of the second end of the arms, and the first supporting foot being located below the corresponding drive assembly;
the second supporting foot, the first end of the second supporting foot being arranged on at least another one of the second end of the arms, and the second supporting foot being located below the corresponding drive assembly;
the third supporting foot, a first end of the third supporting foot being mounted to a bottom wall of the housing, wherein the first supporting foot, the second supporting foot and the third supporting foot are distributed in a triangular shape.

13. The aircraft according to claim 12,
wherein the anti-skid assembly mounted to the other end of the third supporting foot.

14. The aircraft according to claim 13,
the second end of the third supporting foot is provided with a clamping part, the clamping part is clamped to the clamping groove.

15. The aircraft according to claim 13, wherein
a clamping part is provided with the clamping groove, the limiting protrusion surrounds the clamping groove, and the limiting protrusion is received in the clamping groove.

* * * * *